US 6,432,019 B1

(12) United States Patent
Yoshida

(10) Patent No.: US 6,432,019 B1
(45) Date of Patent: Aug. 13, 2002

(54) HYDRAULIC CIRCUIT FOR TOROIDAL CONTINUOUS VARIABLE TRANSMISSION

(75) Inventor: Takeo Yoshida, Fuji (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/618,562

(22) Filed: Jul. 18, 2000

(30) Foreign Application Priority Data

Sep. 30, 1999 (JP) ............................................. 11-279855

(51) Int. Cl.$^7$ ................................................ F16H 37/02
(52) U.S. Cl. ...................................... 475/216; 475/129
(58) Field of Search ................................ 475/120, 127, 475/128, 129, 216

(56) References Cited

U.S. PATENT DOCUMENTS

| | | | | |
|---|---|---|---|---|
| 3,754,482 A | * | 8/1973 | Sanders et al. | 475/120 |
| 4,347,765 A | * | 9/1982 | Leonard et al. | 475/127 X |
| 5,213,011 A | * | 5/1993 | Nobumoto et al. | 475/216 X |
| 5,372,555 A | * | 12/1994 | Hibi | 475/216 X |
| 5,542,888 A | * | 8/1996 | Takada et al. | 475/129 X |
| 5,902,207 A | * | 5/1999 | Sugihara | 475/127 X |

FOREIGN PATENT DOCUMENTS

| | | |
|---|---|---|
| JP | 02-42251 | 2/1990 |
| JP | 02-62468 | 3/1990 |
| JP | 5-39847 | 2/1993 |
| JP | 10-148244 | 6/1998 |
| JP | 11-30317 | 2/1999 |

* cited by examiner

Primary Examiner—Charles A Marmor
Assistant Examiner—Ha Ho
(74) Attorney, Agent, or Firm—Foley & Lardner

(57) ABSTRACT

A forward clutch choke (251) having an internal long narrow path is provided in an oil path which feeds a clutch pressure ($P_{FWD/C}$) to an oil chamber (604) of a forward clutch mechanism (6). The choke restricts a flow of the hydraulic oil into the oil chamber at a low temperature where the viscosity of the hydraulic oil is high to thereby increase a time required for the oil chamber to be filled with the oil, which prevents the clutch mechanism (6) from being engaged tightly in a short time to thereby prevent an instantaneous rise in the output shaft torque. Since the viscosity of the hydraulic oil is low at normal temperature and the choke functions as an orifice, the clutch mechanism is smoothly engaged tightly based on the operation of an accumulator concerned (FIG. 4).

7 Claims, 7 Drawing Sheets

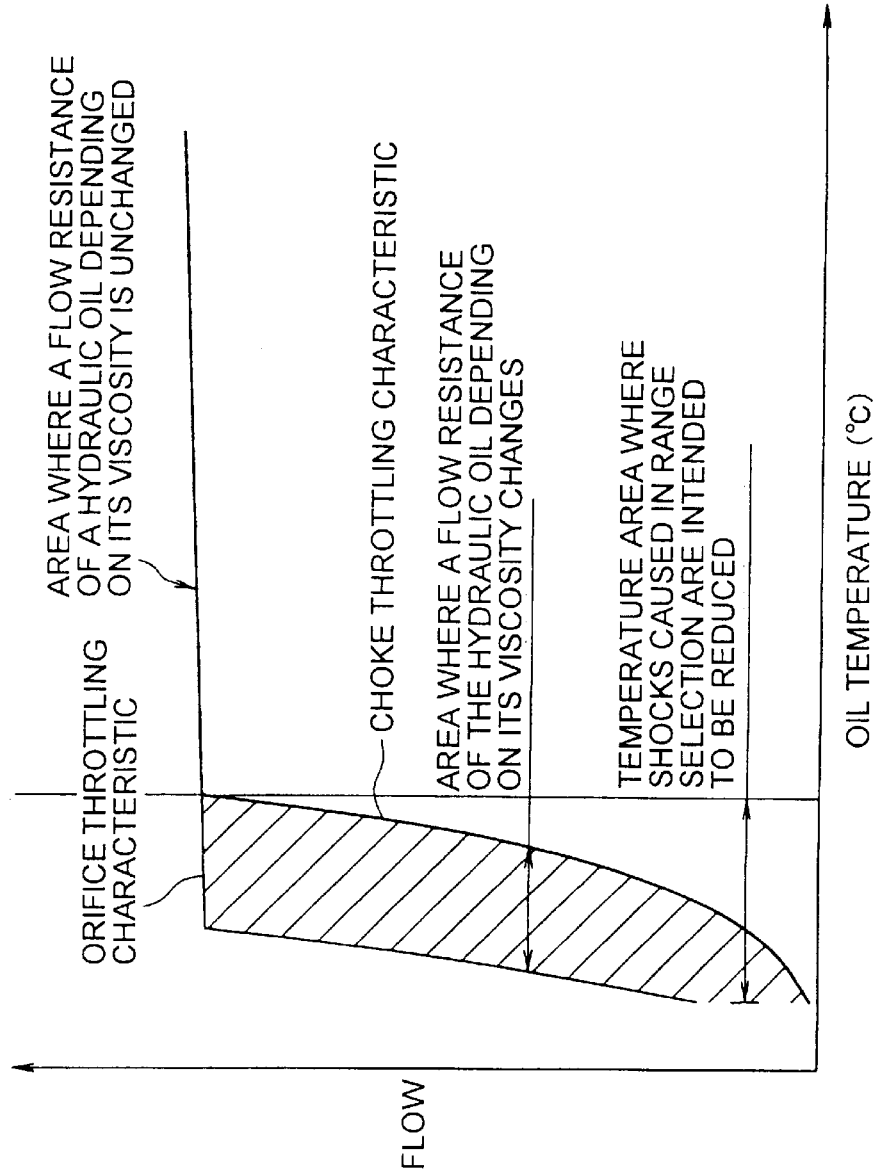

HYDRAULIC CIRCUIT FOR TOROIDAL CONTINUOUS VARIABLE TRANSMISSION

BACKGROUND OF THE INVENTION

1. Field of the Invention

The present invention relates to hydraulic circuits for toroidal continuous variable transmissions (CVT) for vehicles in which frictional rollers are disposed between an input disk and an output disk such that rolling states of the frictional rollers are changed to thereby change a rotational speed ratio between the input and output shafts, and more particularly to improvements to a section for feeding a hydraulic pressure to the frictional elements which couple the input and output shafts for moving a vehicle forward or backward.

2. Description of the Prior Art

One of the conventional toroidal continuous variable transmissions is disclosed, for example, in Japanese unexamined patent publication No. 10-148244. This transmission includes frictional rollers called power rollers disposed in a toroidal groove formed between opposing surfaces of a pair of input and output disks disposed on the same shaft and supported rotatably by supporting mechanisms called trunnions. This supporting mechanism is driven by a hydraulic cylinder in a direction perpendicular to the axes of the frictional rollers and also to the common axis of the input and output disks. When the positional relationship between the axes of the frictional rollers and that of the input and output disks changes, the rotational direction of the frictional rollers and the rotational direction of the input torque applied from the input disk changes from their original ones, which causes axes of the frictional rollers to tilt between the input and output disks. Thus, a contact radius defined by a distance between each of the centers of the input and output disks and a corresponding one of points on the input and output disks where the respective frictional rollers contact with both the input and output disks changes to thereby change the ratio in rotational speed between the input and output.

Such hydraulic circuit for the toroidal continuous variable transmission is disclosed, for example, in Japanese unexamined patent publication No. 11-30317. Since the hydraulic circuit involves an automatic transmission, responsibility of the hydraulic pressure control involves that of speed change control. As well known, the responsibility of the hydraulic control changes depending on the viscosity of the hydraulic oil, which, in turn, depends on its temperature. A hydraulic control device for an automatic transmission which takes account of a temperature dependency of the hydraulic oil viscosity is disclosed, for example, in Japanese unexamined patent publications Nos. 2-42251 and 2-62468. In the former, the hydraulic oil pressure is set at a high value in order to improve the responsibility of the hydraulic oil at a low temperature since the viscosity of the hydraulic oil is high at the low temperature. In the latter, temperature sensing means senses the temperature of the hydraulic oil and the set hydraulic pressure is adjusted depending on its detected temperature in order to cope with the temperature dependency of the hydraulic oil viscosity.

The most important destination of the hydraulic pressure in the hydraulic circuit for the toroidal continuous variable transmission is a hydraulic pressure cylinder which drives the supporting mechanism to tilt axes of the frictional rollers. Since the hydraulic pressure cylinder supports a torque transmitted between the frictional rollers and the input and output disks, a proper substantial hydraulic pressure is required for that purpose. In the hydraulic pressure circuit for the automatic transmission, the highest adjusted hydraulic pressure is called a line pressure. In the case of the toroidal continuous variable transmission, the line pressure is set at a higher value than those in general automatic transmissions. In this case, the hydraulic pressures fed to other destinations are high as a whole, especially as long as the line pressure is not reduced. Thus, the hydraulic pressures are also high which are fed to frictional elements such as clutch elements which connect the input and output shafts to move the vehicle forward or backward.

Since the viscosity of the hydraulic oil is high at a low temperature, as described above, the line pressure is also set at a high value to ensure the required responsibility even in the toroidal continuous variable transmission. Thus, for example, if a travel range such as a D- or R- range is selected in a state where a non-travel range such as an N- or P- range is set when the vehicle is at a stop and the temperature of the hydraulic oil is low, a high hydraulic oil pressure is fed instantaneously to the frictional elements which connect the input and output shafts to move the vehicle forward or backward. Generally, in the case of frictional elements such as clutch elements, a volume of the cylinder chamber is set by allowing for a time required for relevant dish plates to come into complete contact with each other to transmit a torque to the output shaft. When high hydraulic oil pressure is fed instantaneously to the cylinder chamber, the cylinder chamber is instantaneously filled with the hydraulic oil, and the frictional elements are engaged in a short time to produce a high torque, which can be a shock.

It is therefore an object of the present invention to provide a hydraulic oil circuit for a toroidal continuous variable transmission in which even when a travel range is selected at a low oil temperature in a state where a non-travel range is selected, the frictional elements for moving the vehicle forward or backward are prevented from engaging with each other in a short time and hence high torque is prevented from being produced instantaneously.

SUMMARY OF THE INVENTION

In order to achieve the above object, accordidng to the present invention, there is provided a hydraulic oil pressure circuit for a toroidal continuous variable transmission for a vehicle in which a point where an input disk and an output disk contact with a frictional roller is changed to adjust a speed ratio, comprising: an input shaft and an output shaft coupled to the input and output disks, respectively; a pair of frictional elements for coupling the input and output shafts for moving the vehicle forward or backward; a source for supplying a hydraulic oil; a pressure control valve for receiving the hydraulic oil from the source and for adjusting a pressure of the hydraulic oil; oil path providing means connected to the pressure control valve for feeding therethrough the adjusted hydraulic pressure to the frictional elements; and a choke provided in the oil path providing means for imparting resistance to a flow of the hydraulic oil fed to the pair of frictional elements through the oil path providing means.

The choke serves to narrow a flow path to increase a flow resistance. In this case, the choke is preferably set such that a ratio of a length of a flow path to its diameter is more than 2. Thus, the flow is reduced in a low temperature area compared to a choke including a short orifice.

The choke is preferably provided upstream of an accumulator which stores the hydraulic oil pressure fed to the frictional elements.

A check valve is preferably provided in parallel with the choke for allowing only a hydraulic oil returning from the pair of frictional elements to pass therethrough.

BRIEF DESCRIPTION OF THE DRAWINGS

FIG. 7 illustrates oil temperature-flow characteristics of orifice and choke throttling.

DESCRIPTION OF THE PREFERRED EMBODIMENTS

Figure 1:
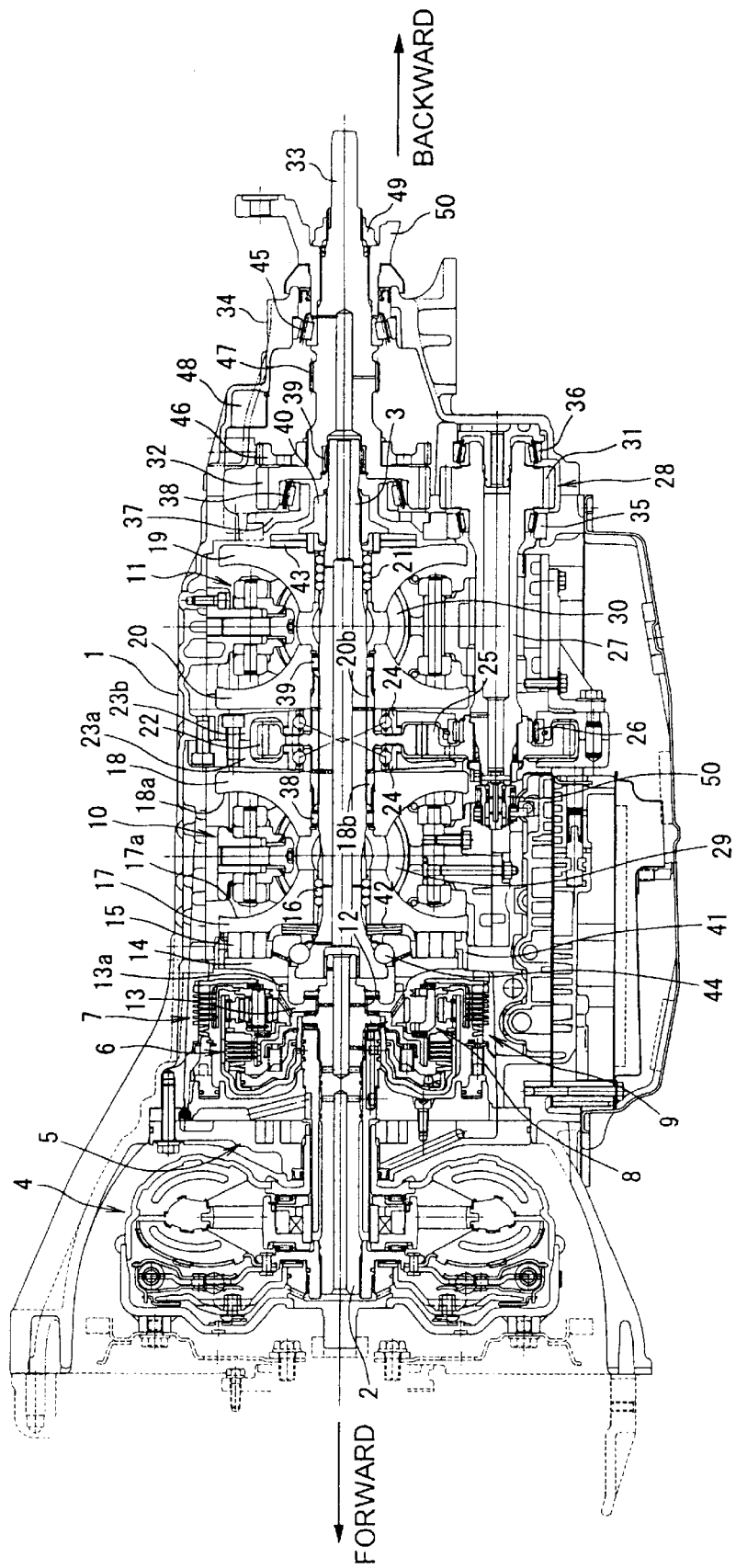
FIG. 1 is a longitudinal cross-sectional view of one ample of a toroidal continuous variable transmission.

A preferred embodiment of a toroidal continuous variable transmission according to the present invention will be described next with reference to the accompanying drawings. Referring to FIG. 1, the composition of the transmission will be briefly explained sequentially from its input side to its output side. A torque of an engine or motor (not shown) is input to an input shaft 2 through a torque converter 4 enclosed in a mission case 1. A CVT shaft 3 is disposed coaxially with the input shaft 2 as a power transmission rotational shaft on the right side of the input shaft 2, which is rotatably supported by an oil pump 5 attached to the mission case 1. To the right of the oil pump 5, a forward-backward movement changeover mechanism 9 is provided which includes a forward clutch mechanism 6 and a backward clutch mechanism 7 to change to rotational direction of the input torque applied to the CVT shaft 3 by changing a fixed element of a planetary gear mechanism 8. A first toroidal transmission mechanism 10 and a second toroidal transmission mechanism 11 which define two corresponding toriodal cavities or grooves are provided axially spaced from each other on the CVT shaft 3. The torque converter 4 has a so-called lockup mechanism.

Provided between the input shaft 2 and the CVT shaft 3 are a sun gear 13 supported rotatably through a bush 12 on the input shaft 2 and composing a part of the planetary gear mechanism 8 of the forward changeover mechanism 9, a loading cam 14 engaged with a craw 13a formed on the sun gear 13 and supported rotatably on the CVT shaft 3, and an input disk 17 connected through engaging rollers 15 with the loading cam 14 and supported through a ball spline 16 by the CVT shaft 3. The rollers 15 are supported rotatably by a holder 41. Thus, the torque transmitted by the engine to the input shaft 2 is, in turn, transmitted to the CVT shaft 3 sequentially through the forward and backward changeover mechanism 9, craw 13a of the sun gear 13, loading cam 14, engaging rollers 15, input disk 17 and ball spline 16 to the CVT shaft 3.

Surfaces of the loading cam 14 and the input disk 17 which are in contact with the rollers 15 include cam faces oppositely increasing gradually in height in the thrust direction. Thus, as the rollers 15 roll along the cam faces, a thrust proportional to the input torque in the axial direction of the torque transmitting CVT shaft 3 is produced. Provided between the loading cam 14 as an input cam and the input disk 17 as an output cam is a belleville spring 42 which acts to move away the loading cam 14 and the input disk 17 from each other. By feeding a predetermined hydraulic pressure to between the cam 14 and the disk 17, the axial thrust is adjusted. The cam 14 is supported rotatably by a ball bearing 44 on the CVT shaft 3.

The first toroidal transmission mechanism 10 includes the input disk 17 which has a toroidal face 17a formed on an opposite side of the disk 17 from its face which is in contact with the rollers 15, and an output disk 18 supported rotatably on the CVT shaft 3 and having a toroidal face 18a opposing the toroidal face 17a of the input disk 17 with the toroidal faces 17a and 18a cooperating to form a first cavity, and frictional power rollers 29 rollable in the first cavity. The power rollers 29 are each supported rotatably by support mechanisms called trunnions, which are operated by a hydraulic cylinder which is servo-controlled by a stepping motor to change a position of each of the power rollers 29 in contact with the input and output disks 17 and 18 in the radial direction of the input and output disks 17 and 18, or a contact radius defined by a distance between the center of each of the input and output disks 17 and 18 and the position of the power roller 29 on the surfaces of the input and output disks 17 and 18, to thereby continuously change a rotational speed ratio of the input disk 17 to the output disk 18.

Like the first toroidal transmission mechanism 10, the second toroidal transmission mechanism 11 includes an input disk 19, an output disk 20, frictional power rollers 30, support mechanisms (trunnions) and a hydraulic pressure driver (cylinders, pistons). In this case, the input disk 19 is externally fitted through a ball spline 21 over the CVT shaft 3 at a position remoter from first toroidal transmission mechanism 10 than the output disk 20. That is, the first and second toroidal transmission mechanisms 10 and 11 are disposed in a line-symmetrical manner. A roller bearing 38 is disposed between the CVT shaft 3 and the output disk 18 of the first toroidal transmission mechanism 10 while a roller bearing 39 is disposed between the CVT shaft 3 and the output disk 20 of the second toroidal transmission mechanism 11.

An output synthesis gear 22 is disposed between the output disks 18 and 20 with hollow cylindrical shafts 18b and 20b which extend in the opposite directions from the center of the output synthesis gear 22 being splined in the respective output disks 18 and 20. The output synthesis gear 22 is supported rotatably through a bearing 24 on gear housings 23a and 23b fixed to the inner peripheral wall of the transmission case 1. The gear 22 meshes with a driven gear 25, which is supported rotatably through a bearing 26 on the gear housing 23b. A counter shaft 27 is splined at one end to the center of the driven gear 25 and supported at the other end rotatably by the transmission case 1 through a roller bearing 35. Thus, the driven gear 25 is rotated together with the counter shaft 27. Thus, the torque transmitted from the engine to the CVT shaft 3 is transmitted into the input disks 17 and 19 of the first and second toroidal transmission mechanisms 10 and 11, transmitted to the output disks 18 and 20 of the toroidal transmission mechanisms 10 and 11 at predetermined speed ratios based on the rolling operation of the power rollers 29 and 30, synthesized by the output synthesis gear 22, and then transmitted through the driven gear 25, counter shaft 27 and gear chain 28 to the output shaft 33. A belleville spring 43 is provided behind the input disk 19 of the second toroidal transmission mechanism 11. By adjusting a tightening torque applied to a nut 40 on a threaded portion of the CVT shaft 3, a thrust produced by the spring 43 is adjusted. A reverse sensor (not shown) is attached to a side of the driven gear 25 of the counter shaft 27 to change over a valve (not shown).

The gear chain 28 includes a counter output gear 31 formed at the other end of the counter shaft 27, an idler gear (not shown) meshing with the gear 31, and an output gear 32 meshing with the idler gear and formed at one end of an output shaft 33 provided coaxially with the CVT shaft 3. The gear chain 28, the output shaft 33, etc., are received within an extension case 34 joined to the rear end of the mission case 1. The counter shaft 27 is supported rotatably at its rear end by a roller bearing 35 placed between the gear 31 and the mission case 1 on one side of the counter output gear 31 and by a roller bearing 36 placed between the gear 31 and the extension case 34 on the other side of the counter output gear 31. The output shaft 33 is supported rotatably by roller bearings 38 placed between the output gear 32 and a rear joiner 37 of the mission case 1, by needle bearings 39 placed between the output gear 32 and the rear end of the CVT shaft 3, and by roller bearings 45 placed between the intermediate portion of the output shaft 33 and the extension case 34. Reference numeral 46 denotes a parking gear splined to the output shaft 33; 47 a speed meter gear formed on the output shaft 33; 48 an air breather formed in the extension case 34; and 49 a nut driven over a threaded portion of the output shaft 33 to position a flange companion 50 connected to the shaft.

Figure 2:
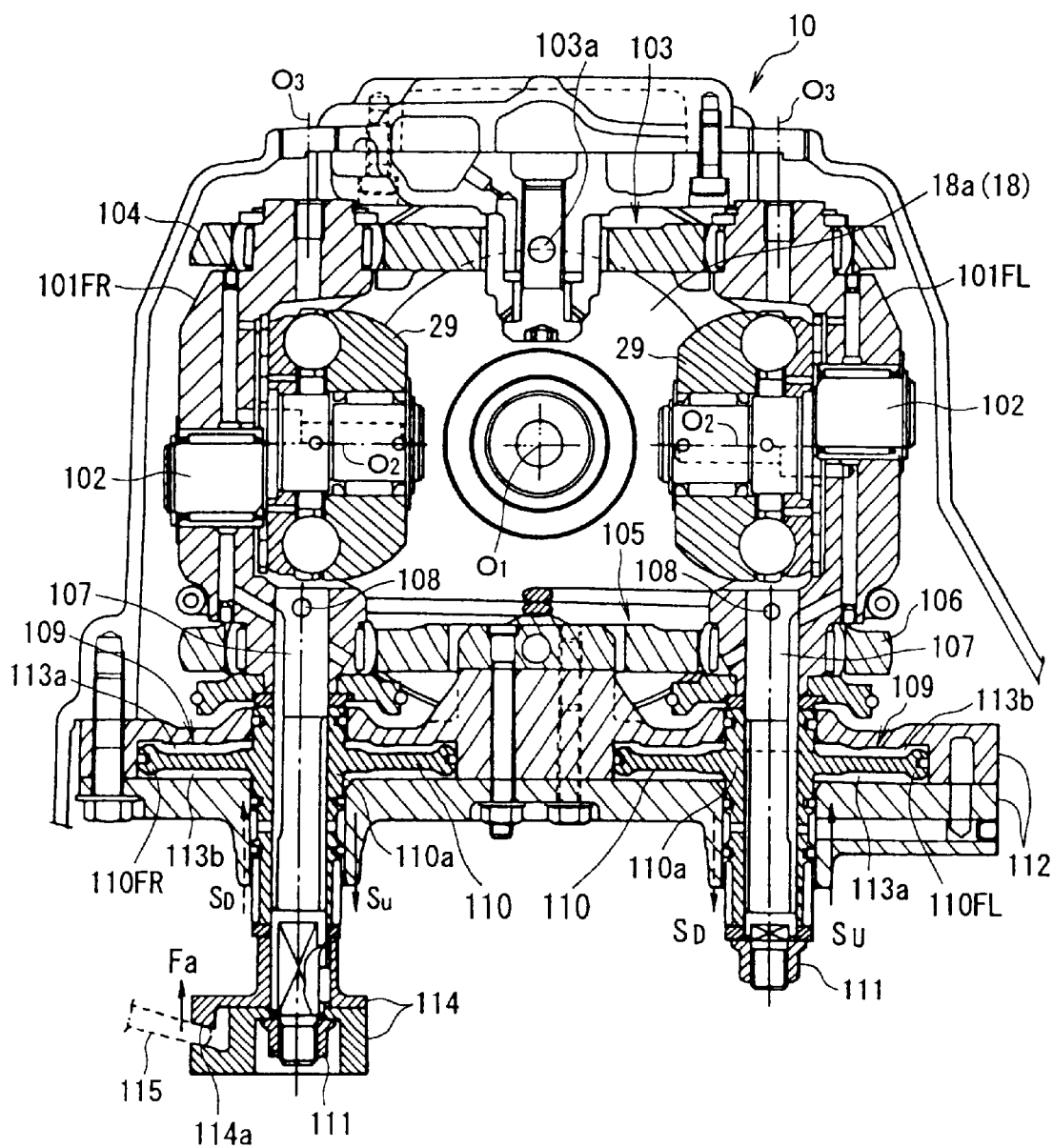
FIG. 2 is a longitudinal cross-sectional view of pair a of power roller supporting mechanisms and a corresponding pair of hydraulic pressure cylinders for use in the toroidal continuous variable transmissions of FIG. 1.

Speed change control provided by the respective toroidal transmission mechanisms will be described briefly next. FIG. 2 is a transversal cross-sectional view of a central cavity in the first toroidal transmission mechanism 10 as viewed rearward. The pair of opposite power rollers 29 are disposed between the input disk (not shown) and the output disk 18 of the first toroidal transmission mechanism 10 on the respective axes $O_1$ such that the torque of the input disk is transmitted to the output disk 18. The pair of power rollers 29 are supported rotatably around their respective pivot shafts whose axes are denoted by $O_2$ and which shafts are secured to corresponding eccentric shafts 102 supported rotatably by the left and right trunnions 101FR and 101FL. The trunnions 101FR and 101FL are connected at an upper end by an upper link 104 of an upper link mechanism 103 and at a lower end by a lower link 106 of a lower link mechanism 105.

The right trunnion 101FL rotatably supporting the right power roller 29 is shiftable vertically from a neutral position where the horizontal axis $O_2$ of the power roller intersects with an axis $O_1$ of the input and output disks along a right vertical axis $O_3$ which intersects at 90 degrees with the axis $O_2$ of the power roller 29. The right trunnion 101FL also is rotatable around the axis $O_3$.

A right trunnion shaft 107 is connected at an upper end by a pin 108 to a lower end of the trunnion 101FL to which the lower link 106 is connected. A piston 110FL of a right hydraulic cylinder 109 fits at its boss 110a over the right trunnion shaft 107. A nut 111 is tightened on a lower threaded portion of the right trunnion shaft 107 to unite the piston 110FL through the right trunnion shaft 107 to the trunnion 101FL. A cylinder body 112 in which the piston 110FL is received has a first right oil chamber 113a formed on the nut 111 side of the piston 110FL, and a second right oil chamber 113b formed on the trunnion 101FL side of the piston 110FL. The right oil chambers 113a and 113b are fed respectively with higher and lower, or lower and higher, hydraulic oil pressures produced by a forward or reverse synchro valve in accordance with a speed ratio instruction. The piston 110FL is shifted along the axis $O_3$ in a specified direction by a quantity depending on a differential between the hydraulic oil pressures in the first and second oil chambers 113a and 113b, which correspondingly shifts the trunnion 101FL along the right axis $O_3$ in the specified direction relative to the input and output disks 17 and 18, which causes the right power roller 29 to rotate around the respective axes $O_2$ and $O_3$ through corresponding angles.

A left trunnion shaft 107 is connected at an upper end by a pin 108 to a lower end of the left trunnion 101FR to which the lower link 106 is connected. A piston 110FR of a left hydraulic cylinder 109 fits at its boss 110a over the left trunnion shaft 107. A precess cam 114 also fits over a lower end of the left trunnion shaft 107. A nut 111 is tightened on a lower threaded portion of the left trunnion shaft 107 to unite the piston 110FR through the left trunnion shaft 107 to the trunnion 101FR. The cylinder body 112 in which the piston 110FR is received has a first left oil chamber 113a formed on the trunnion 101FR side of the piston 110FR, and a second left oil chamber 113b formed on the nut 111 side of the piston 110FR. The left oil chambers 113a and 113b are fed respectively with higher and lower, or lower and higher, hydraulic oil pressures produced by the forward or reverse synchro valve in accordance with a speed ratio ratio instruction. The piston 110FR is shifted along the axis $O_3$ in a specified direction by a quantity depending on a differential between the higher and lower, or lower and higher, hydraulic oil pressures in the first and second oil chambers 113a and 113b, which correspondingly shifts the trunnion 101FR along the left axis $O_3$ in the specified direction relative to the input and output disks 17 and 18, which causes the left power roller 29 to rotate through corresponding angles around the respective left axes $O_2$ and $O_3$.

It is noted that when the right trunnion shaft 107 moves upward, the left trunnion shaft 107 is moved downward based on the seesawing operation of the upper link 104 around a pivot 103a.

The precess cam 114 has a guide groove 114a inclined relative to the left axis $O_3$ in which a speed change link 115 driven by the stepping motor (not shown) is engaged at one end to feed back a deviation (including a vertical offset and a rolling quantity) of the left power roller 29 caused by the vertical movement of the left trunnion shaft 107 to the forward or reverse synchro valve. A biasing force Fa acting upward along the axis $O_3$ (Fa in FIG. 2) is exerted normally by a return spring (not shown) through the speed change link 115 on the piston 110FR such that the speed change link 115 is normally engaged at its hooked end in the guide groove 114a.

In the second toroidal transmission mechanism 11, the left power roller 30 is supported by a left support structure substantially identical to the right one which supports the power roller 29 of FIG. 2. A cylinder body 112 in which a left piston 110RL is received has a first right oil chamber 113a formed on a trunnion 101RL side of the piston 110RL, and a left second oil chamber 113b formed on a nut 111 side of the piston 110RL. Those oil chambers 113a and 113b are fed with higher and lower, or lower and higher, hydraulic oil pressure produced by a forward or reverse synchro valve in accordance with a speed ratio instruction. The left piston 110RL is shifted along the left axis $O_3$ in a specified direction by a quantity depending on a differential between the higher and lower, or lower and higher, hydraulic oil pressures in the first and second oil chambers 113a and 113b, which shifts the left trunnion 101RL along the left axis $O_3$ in the specified direction relative to the input and output disks 17 and 18, which causes the left power roller 30 to rotate or roll around the respective left axes $O_2$ and $O_3$ through corresponding angles between the input and output dishes.

A structure which supports a right power roller 30 is similar to that of FIG. 2 which supports the right power roller 29. The cylinder body 112 in which the right piston 110RR is received has a first right oil chamber 113*a* formed on the right trunnion 101RR side of the right piston 110RR, and a second right oil chamber 113*b* formed on the nut 111 side of the right piston 110RR. Those oil chambers are fed with higher and lower, or lower and higher, hydraulic oil pressures produced by a forward or reverse synchro valve in accordance with a speed ratio instruction. The right piston 110RR is shifted along on the right axis $O_3$ in a specified direction by a quantity depending on a differential between the higher and lower, or lower and higher, hydraulic oil pressures in the first and second right oil chambers 113*a* and 113*b*, which shifts the right trunnion 101RR along the right axis $O_3$ in the specified direction relative to the input and output disks 17 and 18, which causes the right power roller 30 to rotate around the respective right axes $O_2$ and $O_3$ through corresponding angles.

While the vehicle is generally travelling forward by driving its engine, the first and second oil chambers 113*a* and 113*b* of the hydraulic cylinders 109 of the first and second toroidal transmission mechanisms are filled with higher and lower high hydraulic pressures fed respectively from the forward synchro valve so as to produce a differential hydraulic pressure which causes the pistons 110FL, 110FR and 110RR and 110RL to move in the direction of a solid line arrow Su along the respective axes $O_3$. Thus, each of the axes $O_2$ of the power rollers 29 and 30 deviates from the axes $O_1$ of the input and output disks and as a result, the rotational directions of the power rollers 29 and 30 and the rotational directions of torques applied by the input disks 17 and 19 change, which causes the power rollers 29 and 30 to rotate around the respective axes $O_3$ of the trunnions 101FL, 101FR and 101RR and 101RL. This changes a contact radius defined by a distance between a center of each of the input disks 17, 19 and a corresponding one of the output disks 18, 20 and a contact point between a corresponding one of the power rollers 29, 30, and the ratio of the input rotational speed to the output one. In this case, the speed ratio is decreased or the speed ratio is changed to a high up-shift side. Conversely, when the oil pressures in the first oil chambers 113*a* of the oil cylinders 109 are reduced and the oil pressures in the corresponding second oil chambers 113*b* are relatively increased to produce a corresponding differential between the hydraulic pressures in the first and second oil chambers 113*a* and 113*b*, the pistons 110FL, 110FR and 110RR and 110RL move in the direction of an arrow $S_D$ shown by a broken line. As a result, the power rollers 29 and 30 rotate in directions reverse to those in which the power rollers 29 and 30 rotated last. In this case, the speed reduction ratio is increased or the speed ratio is changed to a lower down-shift side.

The rotating directions of each of the power rollers 30 around the their axes $O_2$ and $O_3$ are reverse to those of a corresponding one of the power rollers 29 around the their axes $O_2$ and $O_3$, and the respective shifting directions of the trunnions 101RR and 101RL of the power roller 30 are reverse to those of the corresponding trunnions 101FL and 101FR of the power rollers 29. The upper and lower link devices 103 and 105 equilibrate the rotationsl quantities of the power rollers 29 and 30 and quantities of shift of their trunnions 101FR, 101FL and 101RR and 101RL. As described above, the input disks 17 and 19 of the first and second toroidal transmission mechanisms 10 and 11 rotate in synchronism with CVT shaft 3, and the output disks 18 and 20 of the first and second toroidal transmission mechanisms 10 and 11 are connected by the output gear 22. Thus, the power rollers 29 and 30 of the first and second toroidal transmission mechanisms 10 and 11 are required to rotate in synchronism with each other around the corresponding respective axes $O_2$ and $O_3$. Thus, the required hydraulic oil pressures are fed simultaneously to the respective hydraulic oil cylinders through a servo mechanism (not shown) by an oil pressure control valve (not shown).

Figure 3:
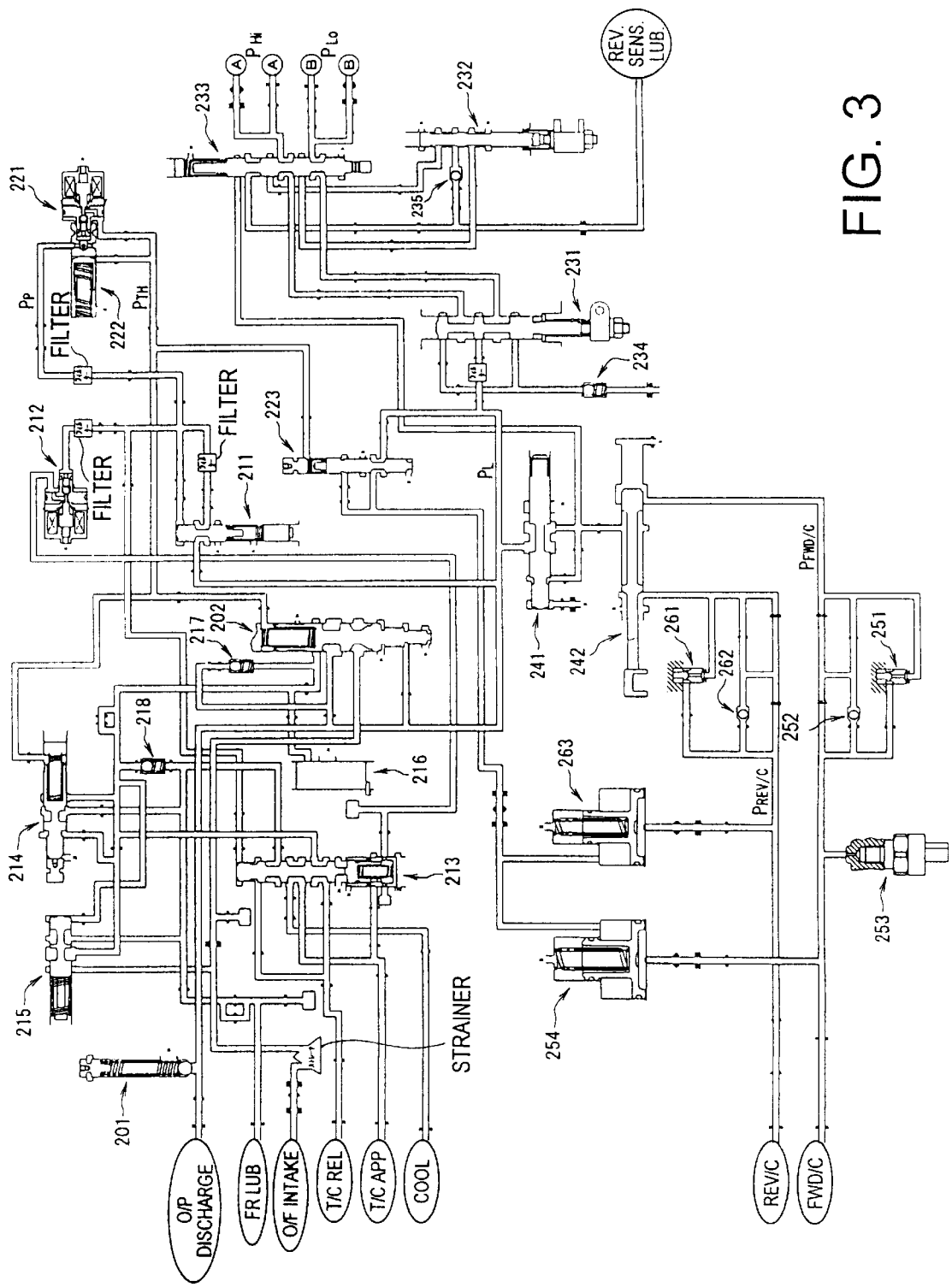
FIG. 3 is a diagram of a hydraulic oil pressure circuit of the toroidal continuous variable transmission.

Referring to FIG. 3, the oil pressure control device of the CVT will be described next. The basic structure of this control device is similar to that described, for example, in Japanese unexamined patent publication No. 5-39847 and components such as valves of the hydraulic circuit are similar to those of the conventional automatic transmission. Thus, those will be described briefly next.

A discharge pressure O/P from an oil pump (not shown) is fed through a line pressure relief valve 201 to a pressure regulator valve 202, which adjusts the discharge pressure O/P, using an output pressure from a line pressure solenoid valve to be described later or a throttled pressure as a pilot pressure, to a line pressure $P_L$ optimal to a traveling state of the vehicle.

A pilot valve 211 adjusts the line pressure $P_L$ to produce a pilot pressure suitable for driving the respective valves concerned. A part of the pilot pressure produced by the pilot valve 211 is adjusted by a lockup solenoid valve 212 and fed as a pilot pressure to a lockup control valve 213, which adjusts a part of the line pressure to a lockup pressure, which is then fed to an engaging or disengaging side T/C APP or T/C REL of the lockup mechanism of the torque converter 4. A lockup regulator valve 214 drives the lockup control valve 213 based on the throttle pressure to adjust the lockup pressure. A torque converter regulator valve 215 adjusts a pressure fed to the lockup control valve 213 in accordance with an output pressure from the lockup regulator valve 214. A torque converter lelief valve 216 releases a pressure fed to the lockup control valve 213 through the torque converter regulator valve 215. Reference numerals 217 and 218 each denote a check valve.

A part of the pilot pressure is adjusted by a line pressure solenoid valve 221 to a throttle pressure $P_{TH}$, a part of which is stored in a throttle accumulator 222.

The forward synchro valve 231 feeds back a deviation of the power roller with the related speed change link 115 driven by the stepping motor while adjusting an up-shift pressure $P_{HI}$ fed to the first oil chamber 113*a* (A in FIG. 3) of the hydraulic pressure cylinder 109 or a down-shift pressure $P_{LO}$ fed to the second hydraulic oil chamber 113*b* (B in FIG. 3) based on the line pressure $P_L$ to control the ratio. The reverse synchro valve 232 feeds back a deviation of the power roller with the related speed change link 115 driven by the stepping motor while adjusting an up-shift pressure $P_{HI}$ fed to the first oil chamber 113*a* of the hydraulic pressure cylinder 109 or a down shift pressure $P_{LO}$ fed to the second hydraulic oil chamber 113*b* based on the line pressure $P_L$ to control the ratio. A reverse drive valve 233 is driven by the reverse sensor to feed the line pressure $P_L$ to the reverse synchro valve 232 when the vehicle moves backward to interrupt the up-shift pressure $P_{HI}$ and the down-shift pressure $P_{LO}$ adjusted by the forward synchro valve 231 and cause the reverse synchro valve 232 to fluid communicate with the first oil chamber 113a or the second oil chamber 113b of the hydraulic oil pressure cylinder 109. Reference numerals 234 and 235 denote a check valve and a check ball, respectively.

An excess part of the line pressure $P_L$ which exceeds the highest pressure required for the clutch of the forward and backward changeover mechanism 9 is discarded by a clutch reducing valve 241. The resulting clutch pressure is fed to one of the forward and backward clutch mechanisms 6 and 7 (FWD/C or REV/C in FIG. 3) selected by a manual valve 242, which is manipulated by a select lever (not shown)(but the clutch pressure is interrupted in the P- or N- range). If the highest pressure required for the clutch is set to the highest line pressure, there are no areas of pressures to be reduced, and the clutch pressure becomes substantially equal to the line pressure $P_L$.

The forward clutch pressure $P_{FW/D/C}$ selected by the manual valve 242 is fed through a forward clutch choke 251 to the forward clutch mechanism 6. Reference numerals 252, 253 and 254 denote a check ball, a pressure sensor and a forward clutch accumulator, respectively.

The reverse clutch pressure $P_{REV/C}$ selected by the manual valve 242 is fed through a reverse clutch choke 261 to the forward clutch mechanism 7. Reference numerals 262 and 263 denote a check ball and a reverse clutch accumulator, respectively.

The back pressures of the forward and reverse clutch accumulators 254 and 263 are controlled by an accumulator control valve 223 in accordance with the throttle pressure $P_{TH}$ or the line pressure $P_L$. Thus, when the line pressure is high, the back pressures become high and accumulation shelf becomes high in range selection.

Figure 4:
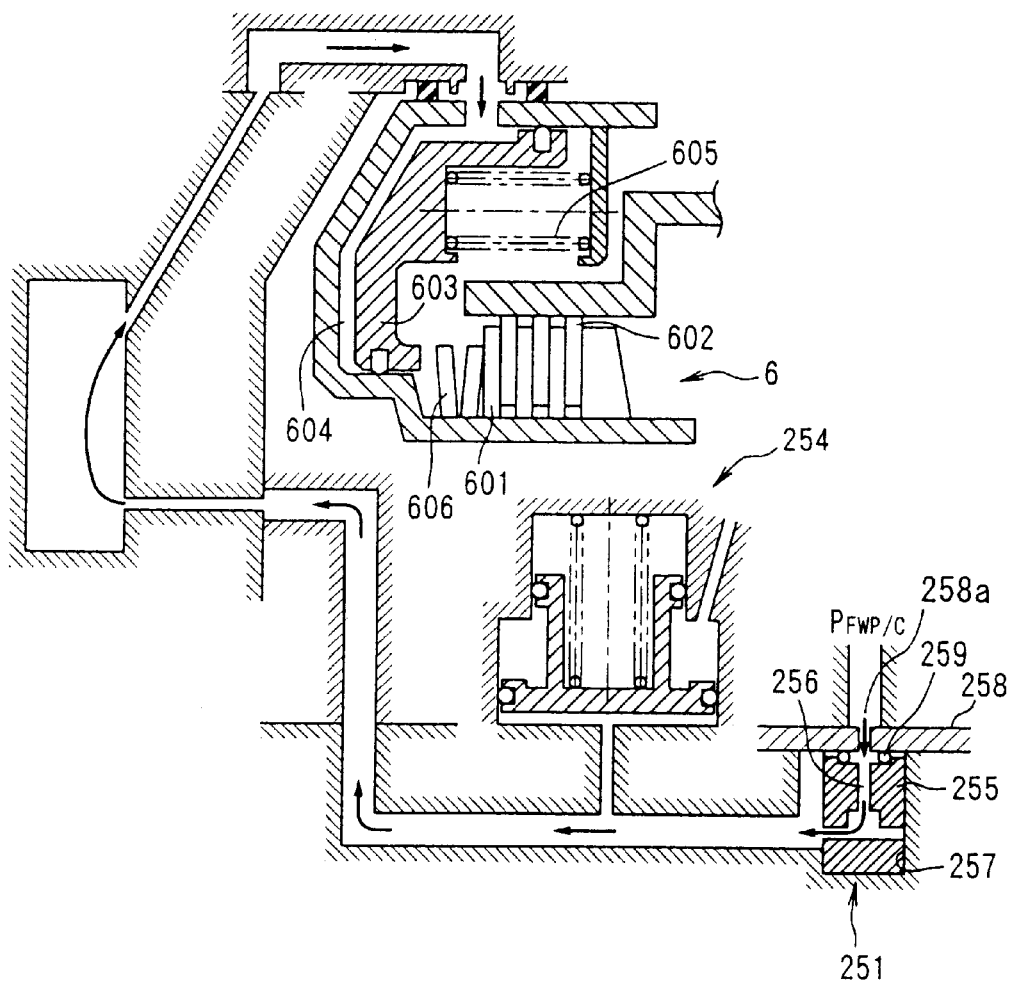
FIG. 4 illustrates the details of a forward clutch mechanism and a forward clutch choke of the oil pressure circuit of FIG. 3.

The details of an oil circuit in which the forward clutch pressure $P_{FW/D/C}$ adjusted by the clutch reducing valve 241 is fed to the forward clutch mechanism 6 are illustrated in FIG. 4. The check ball 252 is not shown in FIG. 4.

The forward clutch mechanism 6 includes driving frictional plates 601, driven frictional plates 602 interdigitated between the driving frictional plates 601, a piston 603 which presses the frictional plates 601 against the frictional plates 602 depending on a hydraulic oil pressure applied to the back of the piston 603 through a chamber 604, drive side dishes 606, and a return spring 605 acting normally so as to return the piston to its original position. When the hydraulic oil fills the oil chamber 604 to apply its forward clutch pressure $P_{FWD/C}$ to the piston 603, the piston 603 compresses the return spring 605 and dishes 606 against their resiliencies to thereby press the frictional plates 601 against the frictional plates 602 or couple the frictional plates 601 strongly with the plates 602. The time when the oil pressure 604 is filled with the hydraulic oil is determined depending on a flow resistance and pressure of the oil path or the forward clutch pressure P. As the flow resistance of the oil path is lower, or as the forward clutch pressure $P_{FWD/C}$ is higher, the oil chamber 604 is filled with the hydraulic oil more rapidly.

Figure 5:
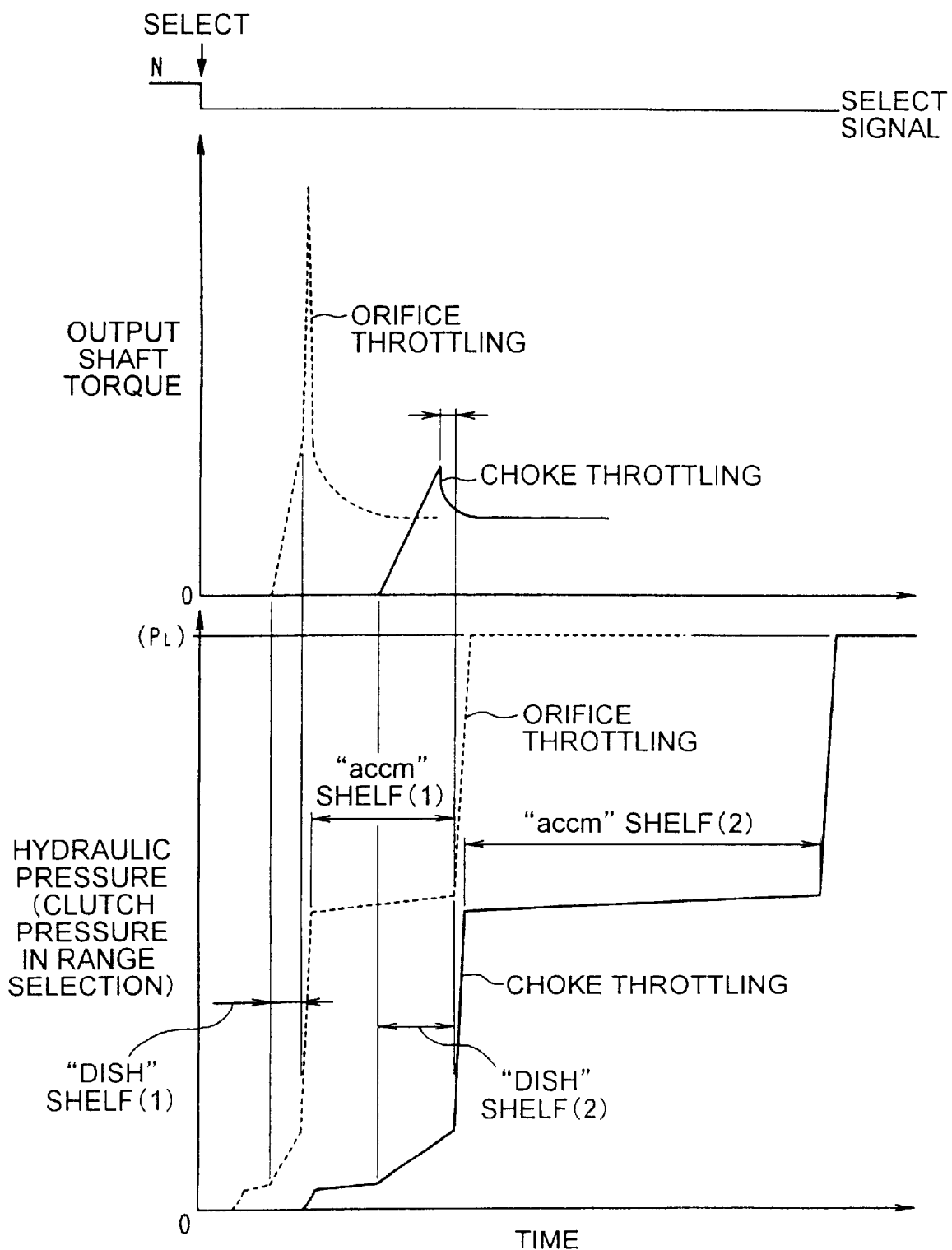
FIG. 5 illustrates changes in a hydraulic pressure fed to the forward clutch mechanism of FIG. 4 at a low temperature and an output shaft torque with time.

The clutch reducing valve 241 is merely a pressure reduction valve, and the forward clutch pressure $P_{FWD/C}$ is substantially equal to the line pressure $P_L$ Thus, if the line pressure $P_L$ is higher, the forward clutch pressure $P_{FWD/C}$ is also higher. As described above, the viscosity of the hydraulic oil is higher at a lower temperature. Thus, in order to ensure the respective required responsibilities involved in the ratio control, the line pressure $P_L$ is set at a higher value and hence the forward clutch pressure $P_{FWD/C}$ is also set at a higher value. Conventionally, the oil path has a separate plate which defines an orifice having a short length therein to provide the same fluid resistance in an overall range of temperatures. Thus, even when one tries to suppress a flow of the hydraulic oil into the oil chamber 604 due to the high forward clutch pressure $P_{FWD/C}$ when a travel range is selected in a state where a non-travel range is set at a low temperature, the orifice having a short throttle portion cannot increase the time required for the hydraulic oil to fill the oil chamber 604. FIG. 5 shows by broken lines a state of the oil pressure at that time. At a lower temperature, the line pressure $P_L$ is higher and the forward clutch pressure $P_{FWD/C}$ is also higher (substantially equal to the line pressure $P_L$), which is the highest line pressure $P_{LMAX}$. Since there are substantially no changes in the flow resistance based on the viscosity of the hydraulic oil in the orifice, the hydraulic oil will flow rapidly into the oil chamber 604 to fill the same. Thus, the time required for filling the oil chamber 604 (shown by a "DISH" shelf (1) in FIG. 5) is short, and as a result, the frictional elements are not engaged tightly in the time shown by the "DISH" shelf (1), after which the clutch mechanism 6 is immediately engaged tightly, and the output shaft torque increases instantaneously as shown by broken lines in FIG. 5, which will be felt as a shock. During this period, since the line pressure $P_L$ which is a back pressure of the forward clutch accumulator 254 is higher, the clutch accumulator is not actuated (in an "accm" shelf (1) in FIG. 5).

In the present embodiment, the forward clutch choke 251 is provided in the hydraulic oil path for the forward clutch pressure $P_{FWD/C}$. The forward clutch choke 251 includes a plug 255 which has therein a long narrow oil path 256 functioning as a choke and placed in a cavity 257 formed in the valve body, which is covered through an 0-like ring 259 by a separate plate 258 with a center hole 258a through which the hydraulic oil can pass to fluid communicate with the oil path 256. Even when a travel range is selected in a state where the non-travel range is selected at a low temperature where the forward clutch pressure $P_{FWD/C}$ or the line pressure PL is higher, the time (shown by a "DISH" shelf (2) in FIG. 5) required for the oil chamber 604 of the forward clutch mechanism 6 to be filled with the hydraulic oil is increased by the forward clutch choke 251, as shown by a solid line in FIG. 5. This causes the frictional plates 601 and 602 of the forward clutch mechanism 6 to slowly move to an original engaged state from a mutually slipping state. Thus, the frictional plates 601 and 602 are tightly engaged in the "DISH" shelf (2), and the output shaft torque smoothly rises without increasing abruptly to be stabilized at a predetermined value, as shown by a solid line.

Figure 6:
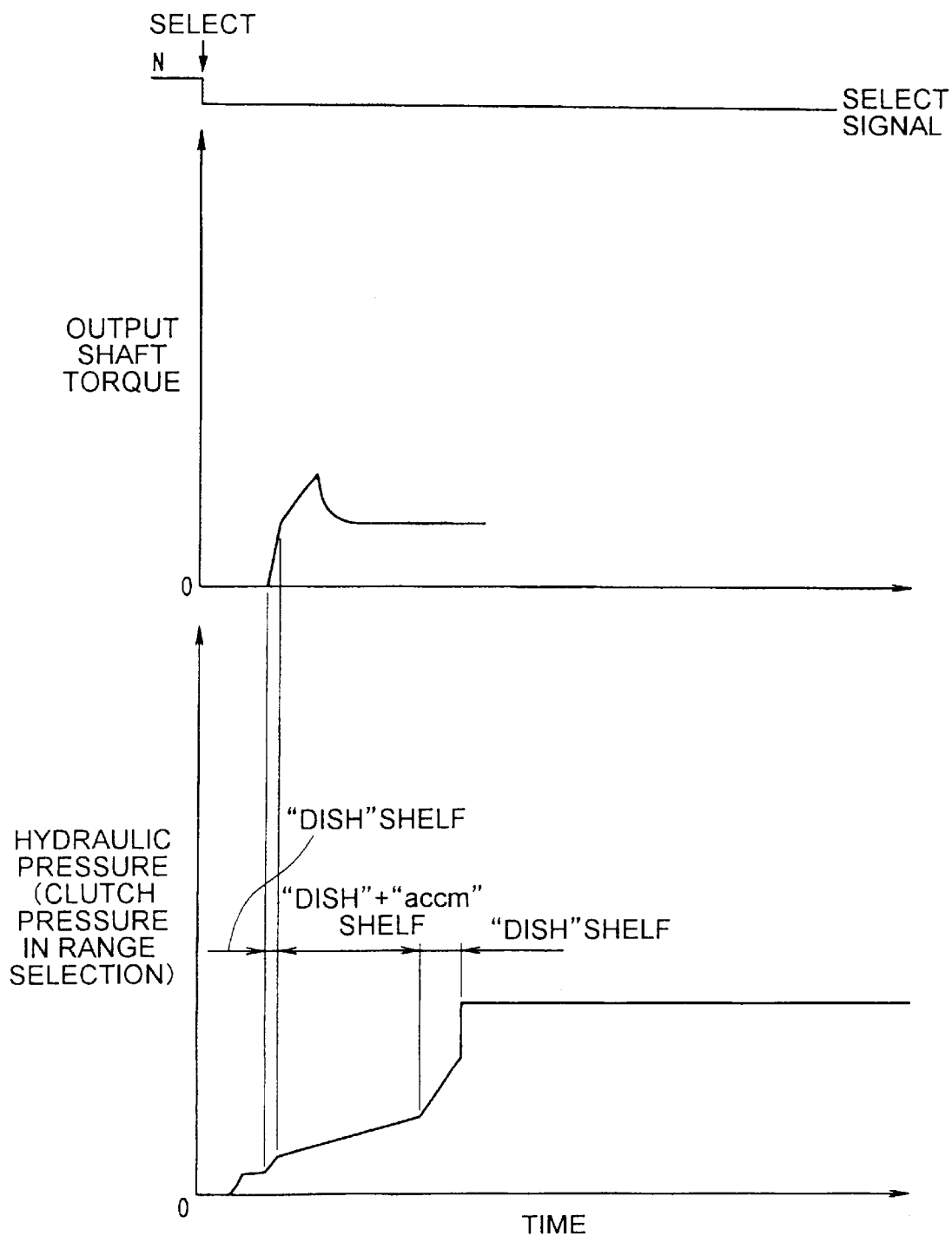
FIG. 6 illustrates changes in the hydraulic pressure fed to the forward clutch mechanism of FIG. 4 at a normal temperature and the output shaft torque with time.

The choke generally has the same function as the orifice in a state where the temperature of the hydraulic oil is higher and its viscosity is lower. When the temperature of the hydraulic oil is at a relatively high normal temperature and the load on the vehicle is small as at a stop, the set line pressure $P_L$ and hence the forward clutch pressure $P_{FWD/C}$ are low. Since the accumulator back pressure is also lower, the forward clutch accumulator 254 can be actuated earlier. Thus, when a travel range is selected in a state where the non-travel range is set at a normal temperature even with the hydraulic circuit of the present embodiment including the choke, the time required for the oil chamber 604 of the forward clutch mechanism 6 to be filled with the hydraulic oil (shown by two "DISH" shelves and a "DISH" +accm shelf present between the two "DISH" shelves) including an actuation period (the "DISH"+accm shelf) of the forward clutch accumulator 254 is increased, during the which the frictional plates 601 and 602 of the forward clutch mechanism 6 slowly move from a state where they slip mutually to a state where they are engaged tightly, as shown in FIG. 6. Thus, the output shaft torque smoothly increases without increasing abruptly to be stabilized at a predetermined value.

A hydraulic oil returning from the forward clutch mechanism 6 (or the backward clutch mechanism 7) passes through the check ball 252 (or check ball 262) to thereby be reduced in pressure.

While in the embodiment the plug having the internal choke is illustrated as being provided in the oil path, a part of the oil path of FIG. 4 may be narrowed to provide a long choke.

While the forward clutch choke function provided between the forward clutch mechanism and the clutch reducing valve has been illustrated, the reverse clutch choke is provided between the backwar clutch mechanism 7 and the clutch reducing valve. Of course, the reverse clutch choke similarly functions for the backward clutch mechanism 7 when the R-range is selected in a state where the non-travel range is selected.

As described above, according to the hydraulic oil pressure circuit for the toroidal continuous variable transmission of the present invention, the choke is provided in the oil path for the forward or backward frictional elements. Thus, the time required for a high-viscosity hydraulic oil to be fed to the frictional elements at a low temperature is increased, as shown in FIG. 7. Therefore, the frictional elements are prevented from being engaged tightly in a short time when a travel range is selected in a state where a non-travel range is set in which the vehicle is at a stop at a low temperature where the set oil pressure is high in order to ensure the required responsibility to thereby prevent instantaneous production of a large torque. Furthermore, since the viscosity of the hydraulic oil is low at a normal temperature, the choke functions as an orifice to throttle a flow of the hydraulic oil fed to the accumulator to thereby cause the frictional elements to engage smoothly.

What is claimed is:

1. The oil circuit of claim 1, wherein said choke includes a restricted flow path, wherein a ratio of a length of the restricted flow path to a width of the flow path is greater than two.

2. The oil circuit according to claim 1, wherein said choke is provided upstream of an accumulator which stores the hydraulic oil pressure fed to said pair of frictional elements.

3. The oil circuit according to claim 1, further comprising:
   a check valve provided in parallel with said choke for allowing only a hydraulic oil returning from said pair of frictional elements to pass therethrough .

4. The oil circuit according to claim 2, further comprising;
   a check valve provided in parallel with said choke for allowing only a hydraulic oil returning from said pair of frictional elements to pass therethrough .

5. The oil circuit of claim 1, wherein the restricted flow path is formed in a plug positioned in the oil path.

6. The oil circuit of claim 5, further comprising a plate having an opening through which the oil path passes through, the opening being aligned with the flow path in the plug.

7. The oil circuit of claim 1, wherein the restricted flow path is integrally formed with the oil path.

* * * * *